United States Patent [19]

Allemang

[11] Patent Number: 5,326,124
[45] Date of Patent: Jul. 5, 1994

[54] BICYCLE WATER DELIVERY APPARATUS

[76] Inventor: Michael Allemang, 2500 Sheridan Rd., Box 220, Zion, Ill. 60099

[21] Appl. No.: 62,439

[22] Filed: May 13, 1993

[51] Int. Cl.[5] .............................................. B62J 11/00
[52] U.S. Cl. ................................. 280/288.4; 222/610; 239/33
[58] Field of Search ...................... 280/288.4; 222/610; 224/30 R, 36; 239/33, 443

[56] References Cited

U.S. PATENT DOCUMENTS

| | | | |
|---|---|---|---|
| 4,095,812 | 6/1978 | Rowe | 280/288.4 |
| 4,274,566 | 6/1981 | Rowe | 280/288.4 X |
| 4,807,813 | 2/1989 | Coleman | 280/288.4 X |
| 4,815,635 | 3/1989 | Porter | 280/288.4 X |
| 4,911,339 | 3/1990 | Cushing | 222/610 |
| 5,143,390 | 9/1992 | Goldsmith | 280/288.4 X |
| 5,158,218 | 10/1992 | Wery | 280/288.4 X |
| 5,201,442 | 4/1993 | Bakalian | 280/288.4 X |
| 5,215,231 | 6/1993 | Paczonay | 280/288.4 X |

Primary Examiner—Richard M. Camby
Assistant Examiner—Carla Mattix
Attorney, Agent, or Firm—Michael R. McKenna

[57] ABSTRACT

This invention relates to an improved water delivery apparatus which may be adapted to be mounted for use on a bicycle in which water may be delivered to be sprayingly discharged through the sprayer or to a mouthpiece which may be placed in a bicycle rider's mouth to allow water to be discharged directly therein. This apparatus operates with an existing standard water bottle for a bicycle and alleviates the possibility of having a stream of water misdirected, distracting the rider, nor will a rider be caught off-guard receiving a stream of water in the face when a spray was anticipated.

15 Claims, 2 Drawing Sheets

BICYCLE WATER DELIVERY APPARATUS

BACKGROUND OF THE INVENTION

The present invention relates to a water delivery system and more particularly pertains to a new and improved delivery apparatus which enables a rider of a bicycle to selectively receive a spray of water for cooling or a stream of water delivered into the rider's mouth for drinking.

The use of various water supply devices used in combination with bicycles is well known in the prior art. The most recent patent in the prior art was issued to Cushing as U.S. Pat. No. 4,911,339 in March of 1990. It provides for a pressurized water container having integral pleated bellows for compressing air and thus pressurizing the water within the system. A hand operated valve regulates the flow of water discharge, and also creates a spray in the direction of the rider. The major disadvantage of the Cushing device is that initial cost in connection with its liquid container which requires an interconnected air bellows to charge the system. Additionally, any recharging of the Cushing device while the bike is in motion would require the rider to divert his attention to re-stroking the bellows, which are inconveniently located on the bottom of the water container. Moreover, since the system is pre-charged, the quantity of liquid discharged and made available to the rider will be dependant upon prior use and subject to depletion requiring the rider to divert his attention to recharge the system.

As disclosed in U.S. Pat. No. 4,095,812 to Rowe, a flexible drinking straw as disclosed may be wound in a retracting reel. While the retractable straw solves a problem related to the backward tilting of the rider's head to obtain a drink from the water bottle, this device is also distracting and unsafe. Moreover, it does not provide for spraying of cool liquid over the rider.

Another watering device is U.S. Pat. No. 5,143,390 issued to Goldsmith for a pressurized apparatus having cycle mounted accessories. This device would be expensive to manufacture as it requires an expandable bag with a bladder for pressurized liquid. It provides for a spray of cooling liquid but does not provide for drinking water.

U.S. Pat. No. 5,119,978 issued to Kalamaras, et al. requires a specially adapted reservoir and provides a straw which may be blown into to provide a spray.

U.S. Pat. No. 4,815,635 issued to Porter provides for a water delivery system having a diaphragm-type pump and a adjustable nozzle, such as that which is employed as the nozzle for a watering hose, which can produce either a spray or a stream of water. One of the disadvantages of the Porter invention is that the stream of water for drinking purposes has to be delivered from a distance, along the handlebars to the rider's mouth, or the rider has to bend over in order to place his mouth near the nozzle, and the nozzle cannot be repositioned for either drinking or spraying purposes without dismounting the bike and adjusting the clamp members.

The disadvantages of the foregoing prior art relate to cost and complexity and the safety disadvantages and in having to depend on a pressurized system.

ADVANTAGE OF THIS INVENTION

An advantage of this invention is that it designed to operate with an existing standard water bottle for bicycles or other portable liquid container. Unlike Cushing and Porter, this valuable invention can provide drinking water directly to the rider's mouth without having the stream of water misdirected, alleviating the possibility of having a stream of water misdirected and distracting the rider while in motion. Nor will a rider be caught off-guard receiving a stream of water in the face when a spray was anticipated.

In one of the preferred embodiments of the present invention, the direction of the spray nozzle spraying can be directed to various portions of the rider's body. And when drinking water is desired the sprayer can be rotated away from the rider yielding a path for the water to flow to the mouthpiece. Additionally, the manually actuated triggering mechanism of this invention provides for a steady flow of water which will not diminish as can occur with a pressurized device. Additionally, no recharging of the apparatus of the present invention while the bike is in motion is required, thus the rider will not be required to divert his attention to re-charge the apparatus.

An even further object of the present invention is to provide a new and improved bicycle water delivery apparatus which is susceptible of a low cost of manufacture with regard to both materials and labor, employing the existing standard water bottle generally associated with a bicycle, and which accordingly is then susceptible of low prices of sale to the consuming public, thereby making such bicycle water delivery apparatus economically available to the buying public.

Still yet another advantage of the present invention is to provide a new and improved bicycle water delivery apparatus which provides in the apparatuses and methods of the prior art some of the advantages thereof, while simultaneously overcoming some of the disadvantages normally associated therewith.

SUMMARY OF THE INVENTION

This invention relates to an improved water delivery apparatus which may be adapted to be mounted for use on a bicycle in which a water bottle is connected by tubing to a pump that is actuated to allow water to be delivered to the pump and discharged through a diverting valve to either form a path through which water may flow to and be sprayingly discharged through the sprayer, or to form a path through which water may flow through a length of flexible tubing to a mouthpiece which may be placed in a bicycle rider's mouth to allow water to be discharged directly therein. This invention resides not in any one of these features per se, but rather in the particular combination of all of them herein disclosed and claimed and it is distinguished from the prior art in this particular combination of all of its structures for the function specified.

DESCRIPTION OF THE PREFERRED EMBODIMENT

Figure 1:
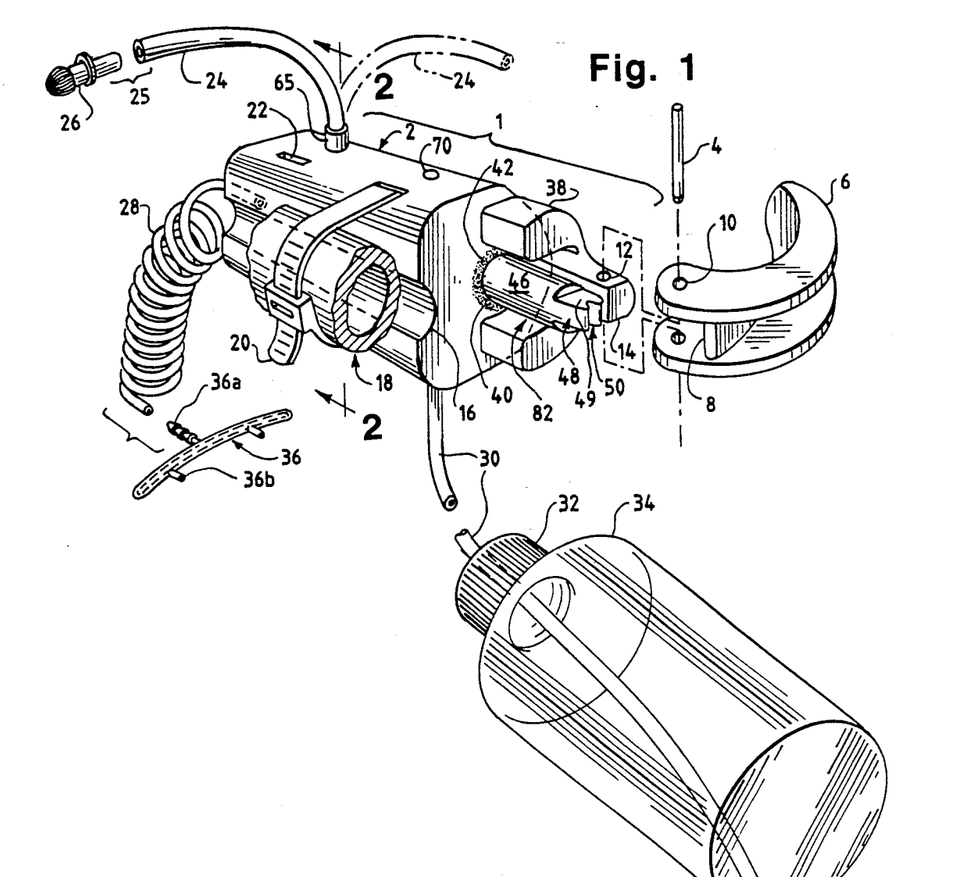
FIG. 1 is a perspective view of a preferred embodiment of the water delivery apparatus showing an integral outer casing of the means for pumping and the diverting valve mounted on the handlebar of a bicycle in which a water bottle is connected by tubing to a pump that is actuated by a manually operated triggering arm (shown detached from the outer casing) and having a sprayer and a length of flexible tubing connected to a mouthpiece.
Figures 2, 3:
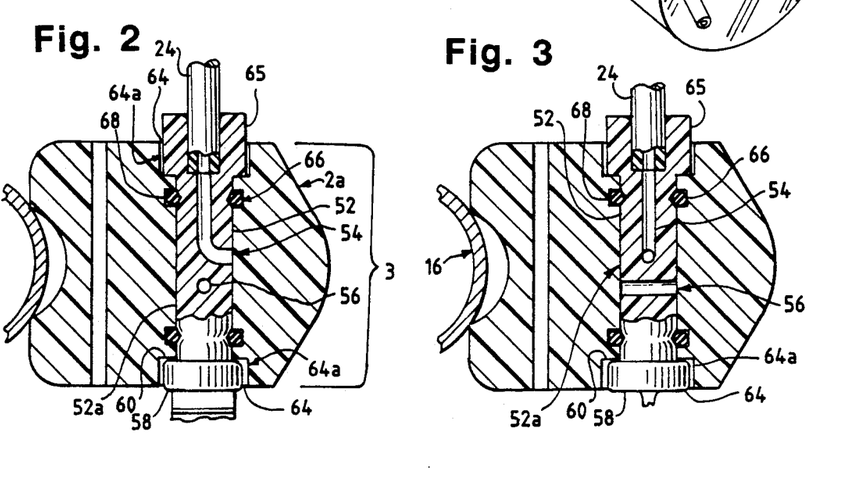
FIG. 2 is a cross sectional view with parts shown in elevation of the integral outer casing taken generally in the plane of line 2—2 of FIG. 1, showing the position of the diverting valve plug when the sprayer is rotated to the phantom position depicted in FIG. 1 positioning the diverting valve plug so that the bore forms a path through which water may flow through a length of flexible tubing to a mouthpiece.
FIG. 3 is a cross sectional view with parts shown in elevation of the integral outer casing taken generally in the plane of line 2—2 of FIG. 1, showing the position of the diverting valve plug when the sprayer is rotated to the position depicted in FIG. 1 positioning the diverting valve plug so that the duct forms a path through which water may flow through the sprayer.

This invention relates to an improved water delivery apparatus of the type, which may be mounted for use on a bicycle having a frame and handlebars 18, in which a water container, such as a bicycle water bottle 34, is operably connected by a first length of tubing 30 to a means for pumping 5 having an inlet and a discharge side and operated by a means for actuation 7, to allow water to be delivered to the inlet side of the pump and discharged from the discharge side thereof, comprising a diverting valve 3, as shown in FIGS. 2 and 3, a means for spraying water (comprising tubing 24 and nozzle 26, referred to as 25), a second length of flexible tubing 28 and a mouthpiece 36, wherein the diverting valve 3 is operably connected to the discharge side of the means for pumping 5, the second length of flexible tubing 28, and the means for spraying water 25, and wherein said diverting valve 3 is selectively operable between a first position, as shown in FIG. 3, so as to form a path through which water may flow to and be sprayingly discharged through the means for spraying water 25, and a second position, as shown in FIG. 2, so as to form a path through which water may flow through the second length of flexible tubing 28, said second length of flexible tubing 28 being operably connected and extending from the diverting valve 3 to the mouthpiece 36 which may be place in a bicycle rider's mouth to allow water to be discharged directly therein.

The water delivery apparatus of the present invention may alternatively be used with or include a bicycle water bottle 34. In a preferred embodiment of the present invention the means for pumping further comprises a pump body 5a having two like inlets 70 in communication with its suction side, each such inlet aligned in opposing relationship to the other, and a means for capping 76 sized and adapted to cap one of said inlets 70, and wherein the means for actuation 7 of said means for pumping 5 is disposed from the pump body 5a transverse to said inlets 70, said means for pumping 5 may be mounted to a bicycle handlebar 18 orienting said means for actuation 7 outwardly in proximity to an end of said handlebar 18, one of said inlets 70 in a downwardly direction, and the other inlet 70 in an opposing upwardly direction, and wherein the downwardly directed inlet 70 may be operably connected to the first length of tubing 30 and the more upwardly directed inlet may be capped by said means for capping 76, whereby said means for pumping 5 may be mounted on right side of the handlebar 18 for actuation by the rider's right hand or mounted on left side of the handlebar 18 for actuation by the rider's left hand with the first length of tubing 30 operatively connected to the inlet 70 that is downwardly directed.

Figures 4, 5:
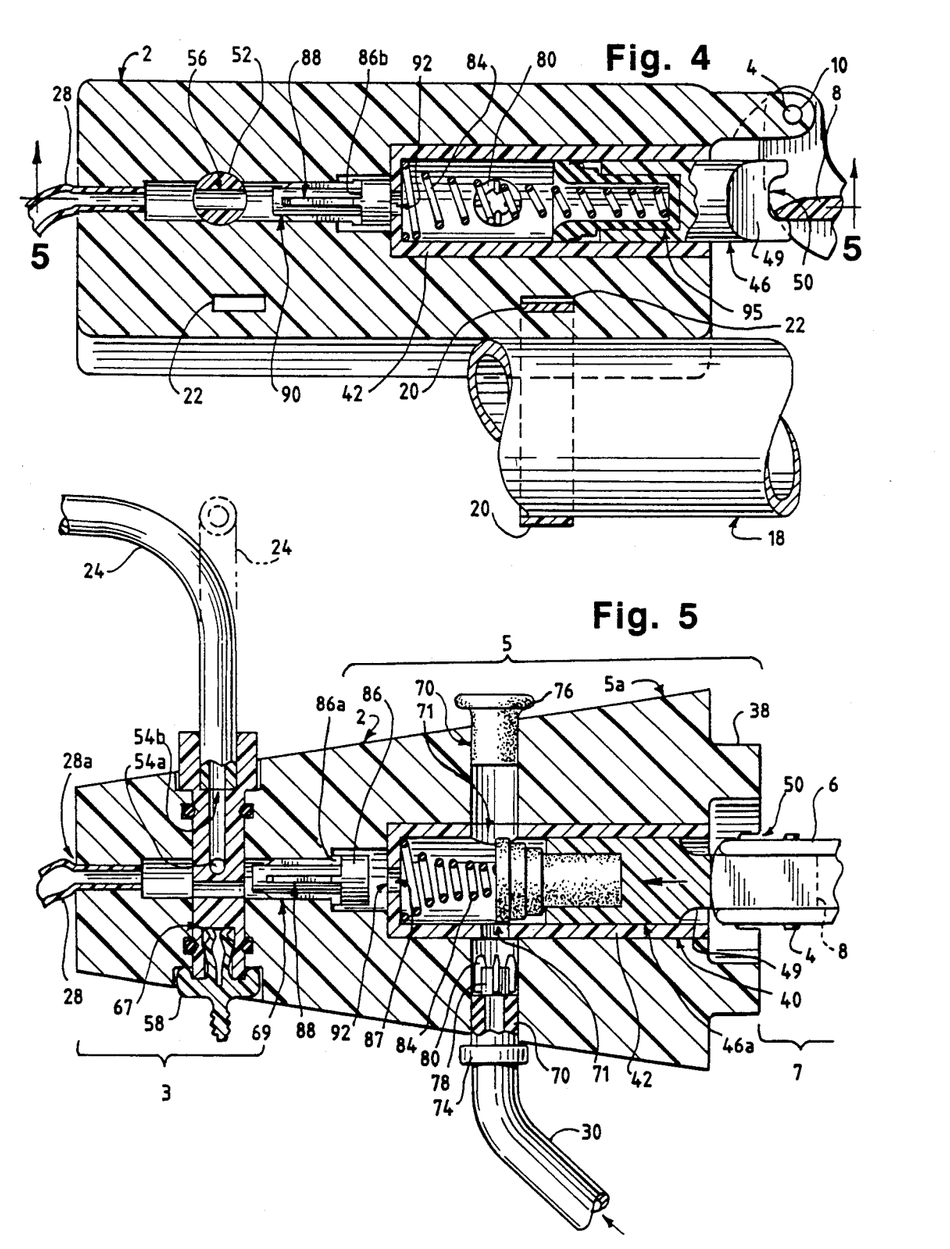
FIG. 4 is a cross sectional view with parts shown in plan view of the integral outer casing taken generally in the horizontal plane of center line of the piston of FIG. 1.
FIG. 5 is a cross sectional view with parts shown in elevation of the integral outer casing taken generally along the plane of line 5—5 of FIG. 4.

FIGS. 2 and 3 show a preferred embodiment of the diverting valve 3 of the present invention comprising a valve body 2a having two like spraying outlets 64 that may be placed in communication with the means for spraying water 25, each such outlet 64 aligned in opposing relationship to the other, wherein one of said spraying outlets 64 may be oriented in one direction and the other in an opposing direction, a means for sealing 58 arranged and adapted to seal one of said spraying outlets 64, and a drinking water outlet 28a, as shown in FIG. 5., disposed from the valve body 2a transverse to said spraying outlets 64, said valve body 2a may be mounted to a bicycle handlebar 18 having a central supporting member orienting said drinking water outlet 28a inwardly toward said central supporting member, one of said spraying outlets 64 in a downwardly direction, and the other spraying outlet 64 in an opposing upwardly direction, and wherein the upwardly directed spraying outlet 64 may be operably connected to the means for spraying 25 and the downwardly directed outlet may be sealed by said means for sealing 58, whereby said diverting valve 3 may be mounted on either side of the handlebar 18 with its drinking water outlet 28a inwardly directed toward the central supporting member and its upwardly directed spraying outlet 64 operably connected to the means for spraying 25 and its downwardly directed outlet 64 sealed by said means for sealing 58.

FIGS. 4 and 5 show a preferred embodiment of the water delivery apparatus 1 wherein the valve body 3 and the pump body 5a are integrally connected forming an outer casing 2 in which the means for actuation 7 is disposed in opposing relationship to the drinking water outlet 28a and in which the inlets 70 and spraying outlets 64 are generally parallel, said outer casing 2 may be mounted to a bicycle handlebar 18 orienting said means for actuation 7 outwardly in proximity to an end of said handlebar 18 and said drinking water outlet 28a inwardly toward said central supporting member with one of said inlets 70 in a downwardly direction, the other inlet 70 in an opposing upwardly direction, one of said spraying outlets 64 in a downwardly direction, and the other spraying outlet 64 in an opposing upwardly direction, whereby said outer casing 2 may be mounted on right side of the handlebar 18 for actuation by the rider's right hand or mounted on left side of the handlebar for actuation by the rider's left hand with the first length of tubing 30 operatively connected to the inlet 70 that is downwardly directed, with its drinking water outlet 28a inwardly directed toward the central supporting member and its upwardly directed spraying outlet 64 operably connected to the means for spraying 25.

Reference is made to FIG. 2, wherein the diverting valve 3 comprises a plug valve body 2a and a plug 52 with a plug retainer 58 disposed therein. The plug valve body 2a has a cavity 52a that has a generally cylindrical central portion with a coaxial annular region 64a of greater diameter at each end of said cavity 52a which ends each form opposing openings of the spraying outlets 64 in an upper and a lower surface, respectively, of the plug valve body 2a.

The plug 52 has an elongated cylindrical section with a head 65 of greater diameter than the cylindrical section thereof coaxially positioned on an end thereof and, as shown in FIG. 5, a recess 67 axially positioned on the other end thereof is arranged and adapted to receive the plug retainer 58 therein. The plug retainer 58 has a outside diameter approximately that of the head 65 of the plug, wherein the diameter of the elongated cylindrical section and of the head 65 of the plug 52 are each sufficiently less than the cylindrical central portion and the coaxial annular region 64a of the cavity 52a of the plug valve body 2a, respectively, to allow the plug 52 to be inserted into either of the opposing openings of the spraying outlets 64, respectively, in the upper and the lower surface of the plug valve body 2a, allowing the head 65 of the plug 52 to nestle in an annular region 64a of the cavity 52a forming said opening of the spraying outlets 64 and the plug retainer 58 to be received in the recess 67 of the other end thereof and to be nestled in the other annular region 64a, and to slidably rotate therein.

FIG. 5 further shows the plug valve body 2a further comprises a fluid inlet 69 centrally disposed within the plug valve body 2a, a centrally disposed fluid outlet 28a arranged and adapted to operably connect with an end of the second length of flexible tubing 28 which tubing may further be operably connected to the mouthpiece 36 at its other end, said fluid inlet 69 and said fluid outlet 28a being coaxially arranged.

The plug 52 has a bore 56 centrally disposed and extending through said plug transverse to the axis thereof, as disclosed in FIG. 3. The plug 52 further comprises a duct 54 generally disposed longitudinally along the axis thereof, which has a 90° bend at its end in proximity to said bore 56 and is throughout its course perpendicular to said bore 56, and which extends from an opening 54b in the end of the plug on the end on which the head 65 is disposed to an opening 54a centrally disposed in the cylindrical wall of said plug 52.

The plug 52 may be rotatably positioned to allow the bore 56 to form a passageway between the fluid inlet 69 and the centrally disposed outlet 28a arranged and adapted to operably connect with an end of the second length of flexible tubing 28 which tubing may further be operably connected to the mouthpiece 36 at its other end. The plug 52 may be rotatably positioned to allow said duct 54 to form a passageway through which water may flow to and be sprayingly discharged through the means for spraying water 25, whereby the fluid inlet 69 is placed in communication with the means for spraying water 25, extending from the fluid inlet 69 of the plug valve body 2a through the opening 54a centrally disposed in the cylindrical wall of said plug through said duct 54 to the opening 54b in the end of the plug on the end on which the head 65 is disposed to the means for spraying water 25 which is operably connected thereto.

In the above described preferred embodiment, shown in FIGS. 2, 3, and 5, the tubing 24 of the means for spraying water is rigidly connected to the end of the plug 52 on which the head 65 is disposed and said plug 52 may be rotatably positioned between its first position (as shown in FIG. 3) and its second position (as shown in FIG. 2) in conjunction with a rotary movement of said means for spraying water 25. The diverting valve 3 further comprises a means to limit rotation of said plug to a quarter turn within said cavity 52a between the first position, wherein the bore 56 is arranged and adapted to be out of alignment to form a path through which water may flow through the second length of flexible tubing 28 and wherein the duct 54 is arranged and adapted to be in alignment to form the path through which water may flow to and be sprayingly discharged through the means for spraying water 25, and the second position, wherein bore 56 is arranged and adapted to be in alignment to form the path through which water may flow through the second length of flexible tubing 28 to the mouthpiece 36 and wherein the duct 54 is arranged and adapted to be out of alignment to form a path through which water may flow to and be sprayingly discharged through the means for spraying water 25. Whereby said diverting valve 3 may be mounted to a bicycle handlebar 18 and a drink of water may be delivered to the mouthpiece 36, which may be positioned in a rider's mouth, as the means for spraying water 25 is rotatably located to position the plug 52 in the first position to allow the duct 54 of the plug 52 to be operably connected thereto and a spray of water may be directed to a bicycle rider's body as the means for spraying water 25 is rotatably located to position the plug 52 in the second position to allow the bore 56 of the plug 52 to be operably connected thereto.

A preferred embodiment of the invention is shown in FIG. 4, wherein the means for pumping 5 further comprises a piston 46 centrally disposed in the pump body 5a, and the means for actuation 7 comprises a manually operated triggering arm 6 exposed therefrom operably connected to the piston 46, means for biasing said piston, such as a coil spring 84, and means for regulating fluid flow comprising an inlet check valve 78 and seat 81 therefor disposed in the uncapped inlet 70 to block the back flow of fluid as the piston 46 is directed into the chamber 40, and a discharge check valve 86 and seat 87 therefor deployed in the discharge 89 of the pump body 5a to block the back flow of fluid as the piston 46 is withdrawn from the chamber 40, each such check valve (78 and 86, respectively) is arranged and adapted to otherwise allow fluid to pass through. This may be accomplished by the use of a footing arrangement (80 and 86a, respectively) on the downstream side of each check valve (78 and 86).

FIG. 5 details the pump body 5a has a generally cylindrical chamber 40 centrally disposed therein having a piston aperture 82 at one end thereof and a discharge outlet opening 92 aligned in opposing relationship thereto on the discharge side thereof. The chamber 40 is arranged and adapted to receive through the piston aperture 82 an elongated hollow sleeve 42 having a cavity 46a therein sized and adapted to snugly fit within said chamber 40 and having an end wall 91 disposed on its inwardly disposed end and a plurality of side wall openings corresponding to and in communication with the openings of said pump body 5a.

There is in the end wall 91 of the hollow sleeve 42 an opening 92 in communication with the discharge outlet 89. The piston 46 has a generally cylindrical outer shape of outside diameter sufficiently less than the inside diameter of the hollow sleeve 42 to seal fluid and allow sliding movement of the piston 46 therein, and with a recess 94 disposed in its inwardly disposed end arranged and adapted to receive and end of a means for biasing, such as a coiled spring 84, to urge said piston 46 out of hollow sleeve 42, and having its exposed end arranged and adapted to cooperate with the manually operated triggering arm 6 exposed therefrom to move said piston 46 into said chamber 40, whereby the discharge check valve 86 is seated blocking back flow and fluid in the water container 34 is drawn through the first length of tubing 30, through the uncapped inlet 70, passed the inlet check valve 78, and into the cavity 46a of the hollow sleeve 42 as the piston 46 is moved out of said cavity 46a by the coiled spring 84, means for biasing, and whereby the inlet check valve 78 is seated blocking back flow and the fluid in the cavity 46a is discharged passed to outlet check valve 86 to the discharge 89 on the discharge side thereof.

In another preferred embodiment of the water delivery apparatus of the present invention, the means for spraying water 25 comprises a flexible and selectively positionable neck, so as to allow water discharged by the means for spraying water to be selectively positioned and directed.

In the preferred embodiment of the water delivery apparatus of the present invention shown in FIG. 1, the mouthpiece 36 comprises an elongated fluid distribution member has a water inlet 36a and at least one water outlet 36b, which can be placed and conveniently held within a rider's mouth. Furthermore, the second length of flexible tubing 28 may be coiled for the convenience of the rider.

In lieu of the means for actuation 7 of the means for pumping comprising a manually operated triggering arm as shown in the drawing, the water delivery apparatus of the present invention a battery powered solenoid and a magnetically responsive plunger in communication with said piston may be employed. Alternatively, an electrically powered solenoid and a magnetically responsive plunger in communication with said piston having a generator driven by a roller engaged to the wheel of the bicycle may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is a follows:

1. An improved water delivery apparatus of the type, adapted for use on a bicycle having a frame and handlebars, in which a water container is operably connected by a first length of tubing to a means for pumping having an inlet and a discharge side and operative by a means for actuation, to allow water to be delivered to the inlet side of the means for pumping and discharged from the discharge side thereof, and a means for mounting, wherein the improvement comprises:
   a. a diverting valve;
   b. a means for spraying water;
   c. a second length of flexible tubing and a mouthpiece;
   wherein the diverting valve is operably connected to the discharge side of the means for pumping, the second length of flexible tubing, and the means for spraying water; and
   wherein said diverting valve is selectively operable between a first position, so as to form a path through which water may flow to and be sprayingly discharged through the means for spraying water, and a second position, so as to form a path through which water may flow through the second length of flexible tubing, said second length of flexible tubing being operably connected and extending from the diverting valve to the mouthpiece which may be placed in a bicycle rider's mouth to allow water to be discharged directly therein.

2. The water delivery apparatus of claim 1, wherein the diverting valve and the means for pumping are integrally connected having an outer casing in which said outer casing may be mounted to a bicycle handlebar orienting said means for actuation outwardly in proximity to an end of said handlebar,
   whereby said outer casing may be mounted on the right side of the handlebar for actuation by the rider's right hand or mounted on the left side of the handlebar for actuation by the rider's left hand with the first length of tubing operatively connected thereto, with the second length of flexible tubing operably connected thereto, and with the means for spraying operably connected thereto.

3. The water delivery apparatus of claim 1, wherein the means for pumping further comprises a pump body having two like inlets in communication with its suction side, each such inlet aligned in opposing relationship to the other, and a means for capping sized and adapted to cap one of said inlets, and wherein the means for actuation of said means for pumping is disposed from the pump body transverse to said inlets,
   said means for pumping may be mounted to a bicycle handlebar orienting said means for actuation outwardly in proximity to an end of said handlebar, one of said inlets in a downwardly direction, and the other inlet in an opposing upwardly direction, and
   wherein the downwardly directed inlet may be operably connected to the first length of tubing and the more upwardly directed inlet may be capped by said means for capping,
   whereby said means for pumping may be mounted on the right side of the handlebar for actuation by the rider's right hand or mounted on the left side of the handlebar for actuation by the rider's left hand with the first length of tubing operatively connected to the inlet that is downwardly directed.

4. The water delivery apparatus of claim 3, wherein the diverting valve further comprises a valve body having two like spraying outlets that may be placed in communication with the means for spraying water, each such spraying outlet aligned in opposing relationship to the other, wherein one of said spraying outlets may be oriented in one direction and the other in an opposing direction, a means for sealing arranged and adapted to seal one of said spraying outlets, and a drinking water outlet disposed from the valve body transverse to said spraying outlets,
   said valve body may be mounted to a bicycle handlebar having a central supporting member orienting said drinking water outlet inwardly toward said central supporting member, one of said spraying outlets in a downwardly direction, and the other spraying outlet in an opposing upwardly direction, and
   wherein the upwardly directed spraying outlet may be operably connected to the means for spraying and the downwardly directed outlet may be sealed by said means for sealing,
   whereby said diverting valve may be mounted on either side of the handlebar with its drinking water outlet inwardly directed toward the central supporting member and its upwardly directed spraying outlet operably connected to the means for spraying and its downwardly directed outlet sealed by said means for sealing.

5. The water delivery apparatus of claim 4, wherein the valve body and the pump body are integrally connected forming an outer casing in which the means for actuation is disposed in opposing relationship to the drinking water outlet and in which the inlets and spraying outlets are generally parallel, said outer casing may be mounted to a bicycle handlebar orienting said means for actuation outwardly in proximity to an end of said handlebar and said drinking water outlet inwardly toward said central supporting member with one of said inlets in a downwardly direction, the other inlet in an opposing upwardly direction, one of said spraying outlets in a downwardly direction, and the other spraying outlet in an opposing upwardly direction, whereby said outer casing may be mounted on the right side of the handlebar for actuation by the rider's right hand or mounted on the left side of the handlebar for actuation by the rider's left hand with the first length of tubing operatively connected to the inlet that is downwardly directed, with its drinking water outlet inwardly directed toward the central supporting member and its upwardly directed spraying outlet operably connected to the means for spraying.

6. The water delivery apparatus of claim 4, wherein the diverting valve comprises a plug valve body and a plug with a plug retainer disposed therein, a. said plug valve body having a cavity that has a generally cylindrical central portion with a coaxial annular region of greater diameter at each end of said cavity which ends each form opposing openings of the spraying outlets in an upper and a lower surface, respectively, of the plug valve body;

b. said plug and elongated cylindrical section with a head of greater diameter than the cylindrical section thereof coaxially positioned on an end thereof and a recess axially positioned on the other end thereof arranged and adapted to receive the plug retainer therein, said plug retainer having an outside diameter approximately that of the head of the plug, wherein the diameter of the elongated cylindrical section and of the head of the plug are each sufficiently less than the cylindrical central portion and the coaxial annular region of the cavity of the plug valve body, respectively, to allow the plug to be inserted into either of the opposing openings, respectively, in the upper and the lower surface of the plug valve body, allowing the head of the plug to nestle in an annular region of the cavity forming said opening and the plug retainer to be received in the recess of the other end thereof and to be nestled in the other annular region, and to slidably rotate therein;

c. said plug valve body further comprises a fluid inlet centrally disposed within said body, a centrally disposed fluid outlet arranged and adapted to operably connect with an end of the second length of flexible tubing which tubing may further be operably connected to the mouthpiece at its other end, said fluid inlet and said fluid outlet being coaxial;

d. said plug having a bore centrally disposed and extending through said plug transverse to the axis thereof, said plug may be rotatably positioned to allow the bore to form a passageway between the fluid inlet and the centrally disposed outlet arranged and adapted to operably connect with an end of the second length of flexible tubing which tubing may further be operably connected to the mouthpiece at its other end, said plug further comprising a duct generally disposed longitudinally along the axis thereof, which has a 90° bend at its end in proximity to said bore and is throughout its course perpendicular to said bore, and which extends from an opening in the end of the plug on the end on which the head is disposed to an opening centrally disposed in the cylindrical wall of said plug, said plug may be rotatably positioned to allow said duct to form a passageway through which water may flow to and be sprayingly discharged through the means for spraying water, whereby the fluid inlet is placed in communication with the means for spraying water, extending from the fluid inlet of the plug valve body through the opening centrally disposed in the cylindrical wall of said plug through said duct to the opening in the end of the plug on the end on which the head is disposed to the means for spraying water which is operably connected thereto;

e. wherein the means for spraying water is rigidly connected to the end of the plug on which the head is disposed and said plug may be rotatably positioned between its first position and its second position in conjunction with a rotary movement of said means for spraying water;

f. said diverting valve further comprising a means to limit rotation of said plug to a quarter turn within said cavity between the first position, wherein the bore is arranged and adapted to be out of alignment to form a path through which water may flow through the second length of flexible tubing and wherein the duct is arranged and adapted to be in alignment to form the path through which water may flow to and be sprayingly discharge through the means for spraying water, and the second position, wherein bore is arranged and adapted to be in alignment to form the path through which water may flow through the second length of flexible tubing to the mouthpiece and wherein the duct is arranged and adapted to be out of alignment to form a path through which water may flow to and be sprayingly discharged through the means for spraying water, whereby said diverting valve may be mounted to a bicycle handlebar and a drink of water may be delivered to the mouthpiece, which may be positioned in a rider's mouth, as the means for spraying water is rotatably located to position the plug in the first position to allow the duct of the plug to be operably connected thereto and a spray of water may be directed to a bicycle rider's body as the means for spraying water is rotatably located to position the plug in the second position to allow the bore of the plug to be operably connected thereto.

7. The water delivery apparatus of claim 6, wherein the means for pumping further comprises a piston centrally disposed in the pump body, and the means for actuation comprises a manually operated triggering arm exposed therefrom operably connected to the piston, means for biasing said piston, such as a coil spring, and means for regulating fluid flow,     a. said means for regulating fluid flow comprising an inlet check valve and seat therefor disposed in the uncapped inlet to block the back flow of fluid as the piston is directed into the chamber, and a discharge check valve and seat therefor deployed in the discharge of the pump body to block the back flow of fluid as the piston is withdrawn from the chamber, each such check valve arranged and adapted to otherwise allow fluid to pass through;

b. said pump body having a generally cylindrical chamber centrally disposed therein having a piston aperture at one end thereof and a discharge outlet opening aligned in opposing relationship thereto on the discharge side thereof,         said chamber arranged and adapted to receive through the piston aperture an elongated hollow sleeve having a cavity therein sized and adapted to snugly fit within said chamber and having an end wall disposed on its inwardly disposed end and a plurality of side wall openings corresponding to an in communication with the openings of said pump body,         said end wall of the hollow sleeve having an opening in communication with the discharge outlet;

c. said piston having a generally cylindrical outer shape of outside diameter sufficiently less than the inside diameter of the hollow sleeve to seal fluid and allow sliding movement of the piston therein, and with a recess disposed in its inwardly disposed end arranged and adapted to receive an end of a means for biasing,such as a coiled spring, to urge said piston out of the hollow sleeve, and having its exposed end arranged and adapted to cooperate with the manually operated triggering arm exposed therefrom to move said piston into said chamber, whereby the discharge check valve is seated blocking back flow and fluid in the water container is drawn through the first length of tubing, through the uncapped inlet, passed the inlet check valve, and into the cavity of the hollow sleeve as the piston is moved out of said cavity by the means for biasing, and whereby the inlet check valve is seated blocking back flow and the fluid in the cavity is discharged passed the outlet check valve to the discharge side thereof.

8. A water delivery apparatus adapted for use on a bicycle having a frame and handlebars, comprising
    a. a water container;
    b. a first length of tubing;
    c. a means for spraying water;
    d. a second length of flexible tubing;
    e. a mouthpiece;
    f. a means for mounting;
    g. a means for pumping having an inlet and a discharge side and operative by a means for actuation,
        i) said means for pumping further comprises a pump body having two like inlets in communication with its suction side, each such inlet aligned in opposing relationship to the other, and a means for capping sized and adapted to cap one of said inlets, and wherein the means for actuation of said means for pumping is disposed from the pump body transverse to said inlets, said means for pumping may be mounted to a bicycle handlebar orienting said means for actuation outwardly in proximity to an end of said handlebar, one of said inlets in a downwardly direction, and the other inlet in an opposing upwardly direction,         wherein the downwardly directed inlet may be operably connected to the first length of tubing and the more upwardly directed inlet may be capped by said means for capping,         ii) said means for pumping further comprises a piston centrally disposed in the pump body, and the means for actuation comprises a manually operated triggering arm exposed therefrom operably connected to the piston, means for biasing said piston, such as a coil spring, and means for regulating fluid flow,         said means for regulating fluid flow comprising an inlet check valve and seat therefor disposed in the uncapped inlet to block the back flow of fluid as the piston is directed into the chamber, and a discharge check valve and seat therefor deployed in the discharge of the pump body to block the back flow of fluid as the piston is withdrawn from the chamber, each such check valve arranged and adapted to otherwise allow fluid to pass through,         iii) said pump body having a generally cylindrical chamber centrally disposed therein having a piston aperture at one end thereof and a discharge outlet opening aligned in opposing relationship thereto on the discharge side thereof,         said chamber arranged and adapted to receive through the piston aperture an elongated hollow sleeve having a cavity therein sized and adapted to snugly fit within said chamber and having an end wall disposed on its inwardly disposed end and a plurality of side wall openings corresponding to and in communication with the openings of said pump body,         said end wall of the hollow sleeve having an opening in communication with the discharge outlet,         iv) said piston having a generally cylindrical outer shape of outside diameter sufficiently less than the inside diameter of the hollow sleeve to seal fluid and allow sliding movement of the piston therein, and with a recess disposed in its inwardly disposed end arranged and adapted to receive an end of a means for biasing, such as a coiled spring, to urge said piston out of the hollow sleeve, and having its exposed end arranged and adapted to cooperate with the manually operated triggering arm exposed therefrom to move said piston into said chamber,         whereby the discharge check valve is seated blocking back flow and fluid in the water container is drawn through the first length of tubing, through the uncapped inlet, passed the inlet check valve, and into the cavity of the hollow sleeve as the piston is moved out of said cavity by the means for biasing, and whereby the inlet check valve is discharged passed the outlet check valve to the discharge side thereof;

a diverting valve operably connected to the discharge side of the means for pumping, the second length of flexible tubing, and the means for spraying water, wherein said diverting valve is selectively operable between a first position, so as to form a path through which water may flow to and be sprayingly discharged through the means for spraying water, and a second position, so as to form a path through which water may flow through the second length of flexible tubing, said second length of flexible tubing being operably connected and extending from the diverting valve to the mouthpiece which may be placed in a bicycle rider's mouth to allow water to be discharged directly therein, comprising a valve body having two like spraying outlets that may be placed in communication with the means for spraying water, each such outlet aligned in opposing relationship to the other, wherein one of said outlets may be oriented in one direction and the other in an opposing direction, a means for sealing arranged and adapted to seal one of said spraying outlets, and a drinking water outlet disposed from the valve body transverse to said spraying outlets, i) said valve body may be mounted to a bicycle handlebar having a central supporting means orienting said drinking water outlet inwardly toward said central supporting member, one of said spraying outlets in a downwardly direction, and the other spraying outlet in an opposing upwardly direction, wherein the upwardly directed spraying outlet may be operably connected to the means for spraying and the downwardly directed outlet may be sealed by said means for sealing, and wherein the valve body and the pump body are integrally connected forming an outer casing in which the means for actuation is disposed in opposing relationship to the drinking water outlet and in which the inlets and spraying outlets are generally parallel, said outer casing may be mounted to a bicycle handlebar orienting said means for actuation outwardly in proximity to an end of said handlebar and said drinking water outlet inwardly toward said central supporting member with one of said inlets in a downwardly direction, the other inlet in an opposing upwardly direction, one of said spraying outlets in a downwardly direction, and the other spraying outlet in an opposing upwardly direction, whereby said outer casing may be mounted on the right side of the handlebar for actuation by the rider's right hand or mounted on the left side of the handlebar for actuation by the rider's left hand with the first length of tubing operatively connected to the inlet that is downwardly directed, with its drinking water outlet inwardly directed toward the central supporting member and its upwardly directed spraying outlet operably connected to the means for spraying, ii) the diverting valve further comprising a plug valve body and a plug with a plug retainer disposed therein, said plug valve body having a cavity that has a generally cylindrical central portion with a coaxial annular region of greater diameter at each end of said cavity which ends each form opposing openings for the spraying outlets in an upper and a lower surface, respectively, of the plug valve body, said plug having an elongated cylindrical section with a head of greater diameter than the cylindrical section thereof coaxially positioned on an end thereof and a recess axially positioned on the other end thereof arranged and adapted to receive the plug retainer therein, said plug retainer having a outside diameter approximately that of the head of the plug, wherein the diameter of the elongated cylindrical section and of the head of the plug are each sufficiently less than the cylindrical central portion and the coaxial annular region of the cavity of the plug valve body, respectively, to allow the plug to be inserted into either of the opposing openings, respectively, in the upper and the lower surface of the plug valve body, allowing the head of the plug to nestle in an annular region of the cavity forming said opening and the plug retainer to be received in the recess of the other end thereof and to be nestled in the other annular region, and to slidably rotate therein, iii) said plug valve body further comprises a fluid inlet centrally disposed within said body, a centrally disposed fluid outlet arranged and adapted to operably connect with an end of the second length of flexible tubing which tubing may further be operably connected to the mouthpiece at its other end, said fluid inlet and said fluid outlet being coaxial, iv) said plug having a bore centrally disposed and extending through said plug transverse to the axis thereof, said plug may be rotatably positioned to allow the bore to form a passageway between the fluid inlet and the centrally disposed outlet arranged and adapted to operably connect with an end of the second length of flexible tubing which tubing may further be operably connected to the mouthpiece at its other end, said plug further comprising a duct generally disposed longitudinally along the axis thereof, which has a 90° bend at its end in proximity to said bore and is throughout its course perpendicular to said bore, and which extends from an opening in the end of the plug on the end on which the head is disposed to an opening centrally disposed in the cylindrical wall of said plug, said plug may be rotatably positioned to allow said duct to form a passageway through which water may flow to and be sprayingly discharged through the means for spraying water, whereby the fluid inlet is placed in communication with the means for spraying water, extending from the fluid inlet of the plug valve body through the opening centrally disposed in the cylindrical wall of said plug through said duct to the opening in the end of the plug on the end on which the head is disposed to the means for spraying water which is operably connected thereto;

v) wherein the means for spraying water is rigidly connected to the end of the plug on which the head is disposed and said plug may be rotatably positioned between its first position and its second position in conjunction with a rotary movement of said means for spraying water, vi) said diverting valve further comprising a means to limit rotation of said plug to a quarter turn within said cavity between the first position, wherein the bore is arranged and adapted to be out of alignment to form a path through which water may flow through the second length of flexible tubing and wherein the duct is arranged and adapted to be in alignment to form the path through which water may flow to and be sprayingly discharged through the means for spraying water, and the second position, wherein bore is arranged and adapted to be in alignment to form the path through which water may flow through the second length of flexible tubing to the mouthpiece and wherein the duct is arranged and adapted to be out of alignment to form a path through which water may flow to and be sprayingly discharged through the means for spraying water, whereby said diverting valve may be mounted to a bicycle handlebar and a drink of water may be delivered to the mouthpiece, which may be positioned in a rider's mouth, as the means for spraying water is rotatably located to position the plug in the first position to allow the duct of the plug to be operably connected thereto and a spray of water may be directed to a bicycle rider's body as the means for spraying water is rotatably located to position the plug in the second position to allow the bore of the plug to be operably connected thereto.

9. The water delivery apparatus of claim 7, wherein the means for spraying water comprises a flexible and selectively positionable neck, so as to allow water discharged by the means for spraying water to be selectively positioned and directed.

10. The water delivery apparatus of claim 9, wherein the mouthpiece comprises an elongated fluid distribution member, having a water inlet and at least one water outlet, which can be placed and conveniently held within a rider's mouth.

11. The water delivery apparatus of claim 10, wherein the second length of flexible tubing is coiled.

12. The water delivery apparatus of claim 11, further comprising a bicycle water bottle.

13. The water delivery apparatus as set forth in claim 7, wherein the means for pumping comprises a battery powered solenoid and a magnetically responsive plunger in communication with said piston.

14. The water delivery apparatus as set forth in claim 7, wherein the means for pumping comprises an electrically powered solenoid and a magnetically responsive plunger in communication with said piston having a generator driven by a roller engaged to the wheel of the bicycle.

15. A water delivery apparatus adapted for use on a bicycle having a frame and handlebars, comprising
   a. a water container;
   b. a first length of tubing;
   c. a means for spraying water;
   d. a second length of flexible tubing;
   e. a mouthpiece;
   f. a means for mounting;
   g. a diverting valve;
   h. a means for pumping having an inlet and a discharge side and operative by a means for actuation,
      said water container operably connected by the first length of tubing to the means for pumping to allow water to be delivered to the inlet side of the means for pumping and discharged from the discharge side thereof,
      wherein the diverting valve is operably connected to the discharge side of the means for pumping, the second length of flexible tubing, and the means for spraying water; and
      wherein said diverting valve is selectively operable between a first position, so as to form a path through which water may flow to and be sprayingly discharged through the means for spraying water, and a second position, so as to form a path through which water may flow through the second length of flexible tubing, said second length of flexible tubing being operably connected and extending from the diverting valve to the mouthpiece which may be placed in a bicycle rider's mouth to allow water to be discharged directly therein.

* * * * *